United States Patent [19]

Heitner

[11] Patent Number: 5,679,740
[45] Date of Patent: Oct. 21, 1997

[54] MECHANICALLY STABLE SELF INVERTING WATER-IN-OIL POLYMER EMULSIONS CONTAINING CARBOXYLATED ETHOXYLATED PHENOLS OR ALCOHOLS

[75] Inventor: Howard Ivan Heitner, Stamford, Conn.

[73] Assignee: Cytec Technology Corp., Wilmington, Del.

[21] Appl. No.: 662,393

[22] Filed: Jun. 13, 1996

[51] Int. Cl.[6] .............................. C08F 2/32; C08J 5/02; C08K 5/09; C08L 33/04
[52] U.S. Cl. .............. 524/801; 524/760; 524/773; 562/587; 562/470; 562/471; 558/276
[58] Field of Search ............................. 524/755, 759, 524/760, 773, 801, 776; 562/587, 470, 471; 558/276

[56] References Cited

U.S. PATENT DOCUMENTS

| 4,022,731 | 5/1977 | Schmitt | 260/29.6 E |
| 4,022,736 | 5/1977 | Schmitt | 260/29.6 E |
| 4,597,838 | 7/1986 | Bammel | 204/44.2 |

Primary Examiner—Vasu S. Jagannathan
Assistant Examiner—U. K. Rajguru
Attorney, Agent, or Firm—Claire M. Schultz

[57] ABSTRACT

Mechanically stable, self-inverting water-in-oil polymer emulsions for use in industrial water treatment, waste water treatment, sludge conditioning, ore dressing, papermaking, secondary and tertiary oil recovery containing carboxylated ethoxylated phenols and alcohols are provided.

15 Claims, No Drawings

MECHANICALLY STABLE SELF INVERTING WATER-IN-OIL POLYMER EMULSIONS CONTAINING CARBOXYLATED ETHOXYLATED PHENOLS OR ALCOHOLS

FIELD OF THE INVENTION

This invention relates to self-inverting water-in-oil polymer emulsions for use in industrial water treatment, waste water treatment, sludge conditioning, ore beneficiation, papermaking, and secondary and tertiary oil recovery.

BACKGROUND OF THE INVENTION

Water-in-oil emulsions are useful delivery systems for water soluble vinyl polymers such as polyacrylamide, polyacrylates and copolymers with other water soluble monomers. These emulsions are useful in commercial applications such as industrial water treatment, waste water treatment, sludge conditioning, ore beneficiation, papermaking, and secondary and tertiary oil recovery.

In order to dissolve the polymer in water it is generally necessary to add a so-called inverting surfactant to either the water or the polymer emulsion as taught in U.S. Reissue Pat. No. 28,474, issued on Jul. 8, 1974.

Self-inverting, water-in-oil emulsions and their uses are known in the art. For example, U.S. Pat. No. 4,022,731 to Schmitt describes a self-inverting, water-in-oil emulsion containing an acrylamide polymer in the aqueous phase, hydrocarbon oil, water-in-oil emulsifier and an inverting surfactant mixture containing two sulfosuccinates or one sulfosuccinate and an alkylphenol ethoxylate.

One major class of compounds which are useful for making self inverting emulsions are ethoxylated alkyl phenols and alcohols as taught in U.S. Pat. No. 4,022,736. One disadvantage of the use of ethoxylated alkyl phenols and alcohols as inverting surfactants is that the resultant emulsions can gel when subjected to mechanical shear.

It has been discovered that a self-inverting water-in-oil polymer emulsion providing smooth polymer solutions in high electrolyte solutions, with improved mechanical stability can be produced using carboxylated ethoxylated alkyl phenols and alcohols.

SUMMARY OF THE INVENTION

The present invention provides a self-inverting, water-in-oil emulsion containing a dispersion therein of finely divided polymer particles, the emulsion comprising water-soluble vinyl polymers in the aqueous phase; oil soluble surfactants; and an inverting surfactant containing carboxylated ethoxylated alkyl phenols and alcohols having the formula R—O—(CH$_2$CH$_2$O)$_n$COOH, where R is an alkyl or other hydrophobic group from C$_8$ to C$_{20}$ or an alkyl phenyl group from C$_{10}$ to C$_{20}$, n is the number of moles of ethylene oxide, from 5 to 25; and optionally, at least one other inverting surfactant. The polymer of this emulsion may be selected from the group consisting of polyacrylamide, polyacrylates and co-polymers thereof with other water soluble monomers.

DETAILED DESCRIPTION OF THE INVENTION

The process of this invention may entail the polymerization of any water-soluble ethylenically unsaturated monomer or combination of such monomers to produce homo or copolymers. Copolymers may be defined as any polymer having two or more different mer units. Suitable monomers include acrylamide; methacrylamide; acrylic acid; methacrylic acid; sodium styrene sulfonate; 3-acrylamido-3-methylbutyltrimethyl ammonium chloride; 2-acrylamido-2-methylpropane sulfonic acid; diallyl quaternary ammonium compounds such as dimethyldiallylammonium chloride; diethyldiallyl ammonium chloride; 2-acrylamido-2-methylpropyltrimethylammonium chloride; 2methacryloyloxyethyl trimethyl ammonium methosulfate; 3-methacryloyl-2-hydroxypropyl trimethylammonium chloride; vinyl-pyrrolidine; fumaric acid; crotonic acid; maleic acid; methacrylamidopropyl trimethyl ammonium chloride; acrylonitrile; vinylbenzyl trimethyl ammonium chloride and other suitable water-soluble vinyl monomers. The preferred monomers, however, are acrylamido-3-methylbutyltrimethylammonium chloride, 2-acrylamido-2-methyl propane sulfonic acid (and its salts), 2-methacryloyloxyethyl trimethylammonium methosulfate, acrylamide, acrylic acid (and its salts)and the diallyl quaternary ammonium compounds. When aqueous solutions of the monomers are used, the aqueous phase can contain from about 20 to 80 percent by weight of the total monomer concentration.

Suitable oil soluble emulsion surfactants include fatty acid esters of sorbitan, ethoxylated fatty acid esters of sorbitan, substituted fatty acid amides as well as other oil soluble surfactants.

The oil soluble emulsion surfactant is generally present in the range of 0.1% to 15.0% by weight based on the total emulsion. Preferably, the oil soluble surfactant is present in the range of 1% to 3%, same basis.

The inverting surfactant mixture useful in the method and emulsion of this invention is particularly directed to those containing carboxylated ethoxylated alkyl phenols and alcohols having the formula R—O—(CH$_2$CH$_2$O)$_n$COOH, where R is a hydrophobic group from C$_8$ to C$_{20}$ or an alkyl phenol from C$_{10}$ to C$_{20}$, n is the number of moles of ethylene oxide, i.e., from 5 to 25, inclusive.

The inverting surfactant is generally present in the range of 0.1% to 5.0% by weight, based on the total emulsion. Preferably, the inverting surfactant is present in the range of 1.0 to 4.0%, same basis.

Optionally, other inverting surfactants may be added. Preferred optional inverting surfactants comprise the reaction product of about one mole of fatty alcohol of about 12 to 18 carbon atoms with from about 6 to 12 moles of ethylene oxide. Also, other inverting surfactants may include sodium bis(2-ethylhexyl)sulfosuccinate, or a sodium bis (C$_{11}$–C$_{15}$ alkyl)sulfosuccinate or an ethoxylated alkyl phenol.

The oil phase may be an inert hydrophobic liquid. A preferred group of organic liquids are the hydrocarbon liquids which include both aromatic and aliphatic compounds. Thus, such organic hydrocarbon liquids as benzene, xylene, toluene, mineral oils, mineral spirits, kerosenes, and naphthas are included.

The amount of oil used in relation to the water to prepare the emulsion may be varied over wide ranges. As a general rule, the ratio of water-to-oil may vary between 5:1 to 1:10, with the preferred ratio of water-to-oil being from 3:1 to 1:10. These ratios are illustrative of those from which emulsions can be prepared, although it should be understood that the invention is not limited thereto.

The polymerization reaction may be carried out at temperatures of from about 0° C. to about 100° C. The preferred range, however, is from about 25° C. to about 75° C.

In the practice of this invention, a typical procedure may be described as follows. The water-in-oil emulsifying agent is dissolved in the oil phase. An aqueous solution of monomer or mixed monomers is then added to the oil phase with agitation until the monomer phase is emulsified in the oil phase. A free radical initiator is dissolved in the oil or monomer phase, depending upon whether an oil or water soluble initiator is used. Either a thermal or redox couple free radical initiator can be used. Polymerization is then initiated to form the corresponding polymer emulsion to which is then added the inverting component.

There are a number of industrial applications for this invention. Particularly applicable is the use of this invention in the bauxite digestion area as flocculants of red mud and washer floc emulsions.

The process of the invention is further described and illustrated by the following examples, which are in no way limiting of the scope of the invention, but are provided for illustration purposes.

EXAMPLE 1

Preparation of self-inverting water-in-oil ammonium acrylate/acrylamide copolymer emulsions A mixture of ammonium acrylate and acrylamide (in % mole ratio of 95:5) was combined with a solution of an oil soluble surfactant and an aliphatic hydrocarbon oil to form a water-in-oil monomer emulsion. The monomers were polymerized by addition of a free radical initiator to produce a water-in-oil polymer emulsion. 3 Parts of a surfactant having the formula $C_{15}H_{31}$—O—$(CH_2CH_2O)_9COOH$ ("surfactant A") were added to 97 parts of this polymer emulsion. 1.5 gm of the product emulsion were added to 298.5 gm of 2% (w/w) sodium hydroxide and stirred for 5 minutes with a paddle stirrer at 200 rpm. The solution was allowed to stand for 30 minutes. The viscosity of the solution was 31.9 cps (Brookfield viscometer, #1 spindle at 60 rpm). The increase in viscosity demonstrates that the emulsion is selfinverting. A small jar containing a magnetic stirring bar was filled with the polymer emulsion containing surfactant A. The polymer emulsion was stirred continuously for 1 week and remained liquid.

Using the same procedure described above, 3 parts of a nonionic surfactant having the empirical formula $C_{15}H_{31}$—O—$(CH_2CH_2O)_{8.5}CH_2CH_2OH$ (an ethoxylated nonylphenol) was added to 97 parts of the same ammonium acrylate/acrylamide polymer described above. 1.5 gm of this emulsion was added to 298.5 gm of 2% (w/w) sodium hydroxide and stirred for 5 minutes with a paddle stirrer at 200 rpm. The solution was allowed to stand for 30 minutes. The viscosity of the solution was 31.6 cps (Brookfield viscometer, #1 spindle at 60 rpm). The increase in viscosity demonstrates that the emulsion is self-inverting. A small jar containing a magnetic stirring bar was filled with the polymer emulsion and stirred continuously under the same conditions used for the polymer emulsion containing surfactant A. After 3 days the emulsion had completely gelled.

EXAMPLE 2

Preparation of self-inverting water-in-oil ammonium acrylate/acrylamide copolymer emulsions 3 Parts of a surfactant having the formula $C_{13}H_{27}$—O—$(CH_2CH_2O)_{19}COOH$ ("surfactant B") were added to 97 parts of the inverting surfactant free ammonium acrylate/acrylamide polymer emulsion described in Example 1. 1.5 gm of the product emulsion was added to 298.5 gm of deionized water while stirring at 200 rpm with paddle stirrer. After 5 minutes of stirring the solution had a viscosity of 384 cps (Brookfield viscometer, #2 spindle at 60 rpm). 1.5 gm of this emulsion was added to 298.5 gm of 2% (w/w) sodium hydroxide, while stirring at 200 rpm with a paddle stirrer. After 5 minutes of stirring the solution had a viscosity of 17.4 cps (Brookfield viscometer, #1 spindle at 60 rpm). The increase in viscosity demonstrates that the emulsion is self-inverting.

EXAMPLE 3

Preparation of self-inverting water-in-oil quaternized, modified polyacrylamide polymer microdispersion A solution of acrylamide is mixed with a hydrocarbon oil and oil soluble surfactants to produce an inverse microdispersion which is then subjected to polymerization conditions with addition of a free radical initiator to produce a water-in-oil polymer microdispersion. This product was then reacted with the reaction product of formaldehyde and dimethylamine to produce a microdispersion of an amino methylated polyacrylamide. This product was then further reacted with methyl chloride to produce water-in-oil microdispersion of an acrylamide polymer containing quaternary ammonium groups. 2 Parts of surfactant A were added to 98 parts of this emulsion. 1.5 gm of the resultant product emulsion was added to 298.5 gm of 0.5% (w/w) sodium carbonate solution while stirring at 200 rpm with a paddle stirrer and stirred for 5 minutes. The solution was then gently stirred with a magnetic stirrer for an additional 60 minutes. The solution had a viscosity of 19.6 cps (Brookfield viscometer, #1 spindle at 60 rpm). The increase in viscosity demonstrates that the microdispersion is self-inverting.

EXAMPLE 4

Preparation of self-inverting water-in-oil acrylamide/acryloyloxyethyltrimethylammonium chloride copolymer emulsions.

In a manner similar to that in Example 1, a solution of acrylamide and acryloyloxyethyltrimethylammonium chloride (with a mole ratio of 9:1 ) was emulsified with an oil soluble emulsifier and a hydrocarbon oil to produce a water-in-oil monomer emulsion. The monomers were polymerized by addition of a free radical initiator to produce a water-in-oil co-polymer emulsion. 2 Parts of "surfactant A" were added to 98 parts of this polymer emulsion. 1.5 gm of the product emulsion was added to 298.5 gm of deionized water while stirring at 200 rpm with paddle stirrer. After 5 minutes of stirring the solution had a viscosity of 73.8 cps (Brookfield viscometer, #1 spindle at 60 rpm). The increase in viscosity demonstrates that the emulsion is self-inverting.

What is claimed is:

1. A method for preparing a mechanically stable, self-inverting, water-in-oil emulsion containing a dispersion therein comprising a) forming a water-in-oil monomer emulsion;

b) forming a water-in-oil polymer emulsion from the monomer of a) using a free radical initiator; and c) admixing the polymer emulsion of b) with an inverting surfactant mixture containing carboxylated ethoxylated alkyl phenols and alcohols having the formula R—O—$(CH_2CH_2O)_nCOOH$, where R is an alkyl or other hydrophobic group from $C_8$ to $C_{20}$ or an alkyl phenol from $C_{10}$ to $C_{20}$, n is the number of moles of ethylene oxide, and optionally, at least one other inverting surfactant.

2. The method of claim 1 wherein the polymer emulsion comprises particles selected from the group consisting of polyacrylamide, polyacrylates and co-polymers with other water soluble polymers.

3. The method of claim 1 wherein the water-in-oil polymer emulsion is comprised of an ammonium acrylate-acrylamide copolymer.

4. The method of claim 3 where the ratio of ammonium acrylate to acrylamide is in a mole ratio of 95:5.

5. The method of claim 1 wherein the water-in-oil polymer emulsion is comprised of an acrylamide polymer.

6. The method of claim 1 wherein R is tridecyl and n is 19.

7. The method of claim 1 wherein R is nonylphenol and n is 9.

8. A mechanically stable, self-inverting, water-in-oil emulsion containing a dispersion therein of finely divided polymer particles, said emulsion comprising:

a) water-soluble vinyl polymers in the aqueous phase;

b) oil soluble surfactants c) inverting surfactant mixture containing carboxylated ethoxylated alkyl phenols and alcohols having the formula $R(CH_2CH_2O)_nCOOH$, where R is a hydrophobic group from $C_8$ to $C_{20}$ or an alkyl phenol from $C_{10}$ to $C_{20}$, and n is the number of moles of ethylene oxide; and d) optionally, at least one other inverting surfactant.

9. The emulsion of claim 8 wherein the vinyl polymer particles are selected from the group consisting of polyacrylamide, polyacrylates and co-polymers with other water soluble polymers.

10. The emulsion of claim 8 wherein the vinyl polymers are comprised of a mixture of ammonium acrylate and acrylamide copolymer.

11. The emulsion of claim 10 wherein the mixture of ammonium acrylate to acrylamide is in a mole ratio of about 95:5.

12. The emulsion of claim 8 wherein the water-in-oil polymer emulsion is comprised of an acrylamide polymer.

13. The emulsion of claim 8 further comprising a free radical initiator to form the water-in-oil polymer emulsions.

14. The emulsion of claim 8 wherein R is tridecyl and n is 19.

15. The emulsion of claim 8 wherein R is nonylphenol and n is 9.

* * * * *